Nov. 8, 1966     T. H. PRIMROSE ETAL     3,284,086

STUFFING BOX PACKING

Filed Oct. 31, 1963

INVENTORS
T. H. PRIMROSE
W. E. BOEN
BY Young and Quigg
ATTORNEYS

3,284,086
STUFFING BOX PACKING
Tommie Haskell Primrose and William Earl Boen, Elmore, Okla., assignors to Phillips Petroleum Company, a corporation of Delaware
Filed Oct. 31, 1963, Ser. No. 320,272
3 Claims. (Cl. 277—1)

This invention relates to a novel packing material for a stuffing box and to a method for its use. In one of its more specific aspects it relates to an improved packing material for a stuffing box in the tubing head of a walking beam operated oil well pump.

A large percentage of all the present-day producing oil wells are equipped with rod-operated plunger pumps. A type of pump used more than any other in oil well service has a cylindrical working barrel suspended from the casing head on a column of tubing so that it is immersed in the well fluid. A plunger in the working barrel is given an up-and-down motion by a column of sucker rods that extend up through tubing to the surface where it is suspended from the end of a power-actuated walking beam or other mechanism capable of giving the rods and plunger the necessary reciprocating motion. The polished rod, on the upper end of the column of sucker rods, passes through a stuffing box that affords an oil-tight passage for the polished rod through the tubing head. A T in the tubing head, just below the stuffing box, provides a connection for the lead line, which carries the oil to storage. Oil enters the lower end of the pump, is lifted to the surface through the working barrel and tubing and is discharged through the lead line. Gas, if present, is removed through outlets in the casing head.

Wear of the packing in the stuffing box is often rapid because of the eccentric thrust of the polished rod, resulting from the arc movement of the walking beam. Stuffing boxes are often equipped with guide bearings made of metal softer than that of the polished rod to relieve the packing of side thrust without scoring the polished rod. The packing material utilized in well head stuffing boxes is usually a neoprene rubber impregnated fabric composition. Other types of oil-resistant rubber and combinations of oil-resistant rubber and nylon or Teflon® are sometimes used.

The problem of short life of packing material in well head stuffing boxes has been a continuing problem for all operated oil well pumps. Wear on the packing necessitates frequent tightening of the packing in the stuffing box. Many proposals have been made for increasing the life of the packing in well head stuffing boxes but none of the proposals have been completely satisfactory. It is necessary to lubricate the stuffing box to avoid burning the packing and scoring the polished rod and to this end oil reservoirs have been combined with the stuffing box to provide lubrication when the well "pumps off," i.e., when the pump has exhausted the liquid in the well bore.

We have discovered that blown solid linear polyolefin fibers provide a superior packing material for stuffing boxes, particularly the stuffing box at the tubing head of an oil well pumped by a walking beam operated pump.

The solid linear polyolefins applicable for use in our invention include the homopolymers of ethylene and propylene and copolymers of ethylene and propylene and ethylene and 1-butene prepared by the low pressure polymerization of the olefins in the presence of a chromium-containing catalyst or an organometal catalyst. The solid linear polyolefins applicable for use in our invention have a Shore D hardness (ASTM D1706–61) of greater than 60 and usually between 60 and 80. A preferred method for preparing the solid linear polyolefins applicable for use in our invention is that described in U.S. Patent 2,825,721, issued March 4, 1958, to J. P. Hogan et al. Alpha olefins or 1-olefins having a maximum of 8 carbons and no branching nearer the double bond than the 4-position are polymerized at a pressure less than 1000 p.s.i.

The blown fibers can be prepared by passing a blast of fluid such as steam or air through the molten polyolefin as in the method of preparing rock wool, mineral wool, glass wool and the like. One specific method for preparing the blown fibers is to extrude the polymer in the form of a ribbon and to pass a blast of air against the extrudate as it emerges from the die. The product is in effect, and in apperaance, polyolefin wool.

It is an object of this invention to provide a stuffing box packing material which does not require lubrication. It is also an object of this invention to provide a packing material which has long life in a stuffing box under severe conditions of use. The provision of a stuffing box which requires infrequent tightening is also an object of this invention. A further object of the invention is to provide a method for packing a stuffing box in an oil well tubing head so that infrequent tightening of the stuffing box packing follower is required. Other objects and advantages of the invention will be apparent to those skilled in the art upon study of this disclosure including the detailed description of the invention and the appended drawing wherein:

Figure 1:
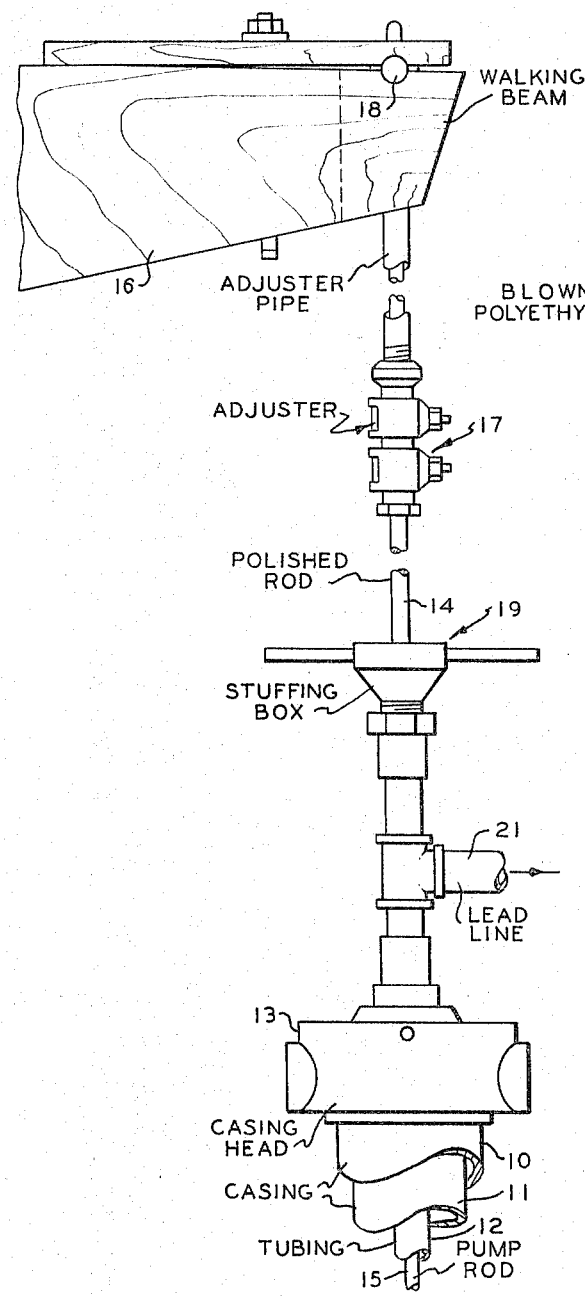
FIGURE 1 is an elevation of a well head showing the relationship of the stuffing box to the other elements.

In FIGURE 1 the casing 10, 11 and tubing 12 are supported at the well head by the casing head 13. The polished rod 14 and pump rods or sucker rods 15 are supported by the walking beam 16. The uppermost sucker rod is threaded onto the polished rod which, in turn, is gripped by the adjuster 17 and supported by the crosshead 18 on the walking beam 16. The crosshead 18 is the pivot point as the polished rod is reciprocated vertically through the stuffing box 19. Oil pumped from the well passes via lead line 21 to storage (not shown). The walking beam is operated in known manner by a prime mover (not shown).

Figure 2:
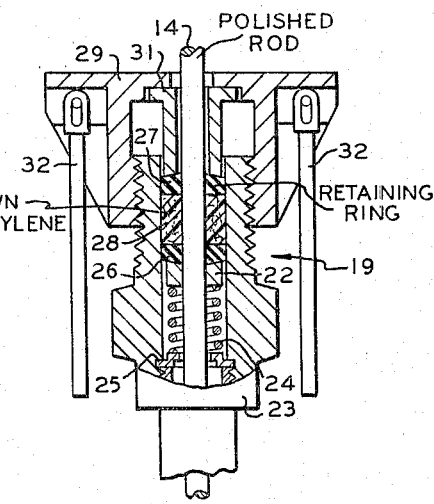
FIGURE 2 is an elevation, in section, of a stuffing box of FIGURE 1 according to the invention.

The stuffing box 19 is shown in greater detail in FIGURE 2. A spring biased bushing 22 provides a seat for the packing material in the body 23 of the stuffing box. Spring 24 is seated upon ring 25 in body 23. The packing is made up of a bottom retaining ring 26, a top retaining ring 27 and blown or fibrous polyethylene 28. The bonnet 29 is threaded onto the body 23 and presses the packing follower 31 against the retainer ring 27. Handles 32 are lifted into horizontal position (as shown in FIGURE 1) to tighten follower 31 against the packing or to remove the bonnet 29.

Figure 3:
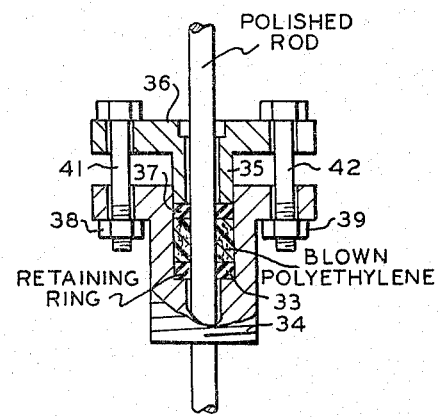
FIGURE 3 is an elevation of another stuffing box according to the invention.

A more simple type of stuffing box is shown in FIGURE 3. The retaining ring 33 is seated directly in the box of body 34. The packing follower 35 is an integral part of bonnet 36 and is pressed against retaining ring 37 by tightening nuts 38 and 39 on bolts 41 and 42.

The polyolefin wool (blown solid linear polyolefin fibers) has been tested in accordance with our invention under various conditions of use in beam operated pumping wells. At eight wells in one oil field, representative of various types of harsh or severe packing conditions, polyolefin wool was installed as packing with a fabric-impregnated, neoprene retaining ring at the top and bottom. Used packing rings were employed as the retaining rings. In these severe cases where conventional packing required daily tightening and complete renewal about once a week, the polyolefin wool packing lasted about four months with tightening required about once a month.

The wells were equipped with various types of stuffing boxes; some with oil reservoirs and some without.

In a representative number of installations where less severe packing problems are encountered where conventional packing had lasted about two months with tightening about every two weeks, the polyolefin packing appears to last indefinitely. Examination of the stuffing boxes of a number of wells, during periods when the wells were shut down for well service operations, revealed no deterioration of the packing.

We have found that absolutely no lubrication of any kind is needed when a stuffing box is packed with the polyolefin wool according to our invention. This means that there is no danger of loss of packing and damage to the polished rod when a well pumps off. We have also found that the polyolefin wool remaining in the stuffing box need not be removed when additional packing is required. The addition of enough polyolefin wool to redevelop a compact packing mass or member is all that is necessary. This does not apply to conventional packing because all of the worn out packing rings must be removed and replaced with new ones in the case of conventional packing. The average well head stuffing box requires about ⅓ pound of polyolefin wool per installation. We have found that the polished rod should be smooth and free of pits because pits in the polished rod can remove small portions of the packing from the stuffing box. Of course, in all cases the polished rod should be properly aligned in the stuffing box.

Comparable runs with other materials including Teflon®, or nylon, vegetable fibers, and the like demonstrated that the polyolefin wool of our invention is a superior packing material and is unique in its requiring no lubrication.

Although the polyolefin wool packing material of our invention is particularly applicable for use in beam pumped well head stuffing boxes, it can be used for packing in stuffing boxes in general. The polyolefin wool has been used successfully in the stuffing boxes of diaphragm operated dump valves which remove oil from oil and gas separators and those which remove water from oil and water separators.

That which is claimed is:

1. The method of packing a stuffing box through which a polished rod reciprocates which comprises placing a first resilient retaining ring in a first end of the stuffing box; compacting blown linear polyethylene fibers into the central portion of the stuffing box; placing a second resilient retaining ring in the second end of the packing box; tightening a stuffing box cover onto the stuffing box to compact the packing about the polished rod, and reciprocating the polished rod through the stuffing box.

2. The method of preventing leakage of well fluids about the polished rod at the well head of a walking beam operated pumping oil well which comprises stopping the pump; removing the cover of the stuffing box; removing all of the packing rings except the bottom ring; compacting blown linear polyethylene fibers into the stuffing box to occupy substantially the volume of all except one of the removed packing rings; replacing one of the packing rings on top of the blown polyethylene fibers; replacing the cover of the stuffing box so as to compact the packing; and starting the pump.

3. The method of packing a stuffing box through which a polished rod reciprocates which comprises placing a first resilient retaining ring in a first end of the stuffing box; compacting in the central portion of the stuffing box polyolefin wool comprising a polyolefin made by polymerizing a 1-olefin polymer at a pressure less than 1000 p.s.i. and blowing the molten polymer with a blast of fluid to produce fibers having a Shore D hardness of at least 60; placing a second resilient retaining ring in the second end of the stuffing box; tightening a stuffing box cover onto the stuffing box to compact the packing about the polished rod; and reciprocating the polished rod in the stuffing box.

References Cited by the Examiner

UNITED STATES PATENTS

| 1,566,816 | 12/1925 | Carlson | 277—102 X |
| 2,048,320 | 7/1936 | Bennett | 277—123 X |
| 2,292,543 | 8/1942 | Patterson | 277—125 X |
| 2,587,474 | 2/1952 | Howard | 277—123 X |

SAMUEL ROTHBERG, *Primary Examiner.*